(12) United States Patent
Narayan et al.

(10) Patent No.: US 12,132,641 B2
(45) Date of Patent: Oct. 29, 2024

(54) ON-DEMAND SETUP AND TEARDOWN OF DYNAMIC PATH SELECTION TUNNELS

(71) Applicant: Arista Networks, Inc., Santa Clara, CA (US)

(72) Inventors: Abhijith Kudupu Narayan, San Ramon, CA (US); Sreedhar Ganjikunta, Cupertino, CA (US); Venkitraman Kasiviswanathan, San Ramon, CA (US); Alton Lo, Fremont, CA (US); Udayakumar Srinivasan, Fremont, CA (US); Kumaran Narayanan, San Ramon, CA (US)

(73) Assignee: Arista Networks, Inc., Santa Clara, CA (US)

( * ) Notice: Subject to any disclaimer, the term of this patent is extended or adjusted under 35 U.S.C. 154(b) by 17 days.

(21) Appl. No.: 17/506,226

(22) Filed: Oct. 20, 2021

(65) Prior Publication Data
US 2023/0124930 A1 Apr. 20, 2023

(51) Int. Cl.
*G06F 15/173* (2006.01)
*H04L 12/46* (2006.01)
(Continued)

(52) U.S. Cl.
CPC ........ *H04L 45/121* (2013.01); *H04L 12/4633* (2013.01); *H04L 45/123* (2013.01);
(Continued)

(58) Field of Classification Search
CPC . H04L 45/121; H04L 12/4633; H04L 45/123; H04L 45/22; H04L 45/42; H04L 45/50; H04L 67/145
See application file for complete search history.

(56) References Cited

U.S. PATENT DOCUMENTS

| 6,538,991 B1* | 3/2003 | Kodialam | H04L 41/5003 |
| | | | 370/395.42 |
| 6,738,910 B1* | 5/2004 | Genty | H04L 12/4633 |
| | | | 713/166 |

(Continued)

OTHER PUBLICATIONS

A. Sajassi, ED. et al., Draft-sajassi-bess-secure-evpn-04, Feb. 22, 2021 (36 pages).

(Continued)

*Primary Examiner* — Phuoc H Nguyen
(74) *Attorney, Agent, or Firm* — Tianyi He

(57) ABSTRACT

In general, embodiments relates to a method for creating an on-demand tunnel (ODT) in a network between a first network device and a second network device, the method comprising: storing by the first network device, a potentially suboptimal path to the second network device, determining that a trigger condition to create the ODT between the first network device and the second network device is satisfied, in response to the determination: transmitting, by the first network device, an ODT signaling packet to the second network device via the potentially suboptimal path, receiving, from the second network device and in response to transmitting the ODT signaling packet, an ODT keepalive by first network device via the ODT, and transmitting, after receiving the ODT keepalive, a second packet to the second network device via the ODT.

20 Claims, 5 Drawing Sheets

(51) Int. Cl.
*H04L 45/00* (2022.01)
*H04L 45/12* (2022.01)
*H04L 45/121* (2022.01)
*H04L 45/42* (2022.01)
*H04L 45/50* (2022.01)
*H04L 67/145* (2022.01)

(52) U.S. Cl.
CPC .............. *H04L 45/22* (2013.01); *H04L 45/42* (2013.01); *H04L 45/50* (2013.01); *H04L 67/145* (2013.01)

(56) References Cited

U.S. PATENT DOCUMENTS

| | | | |
|---|---|---|---|
| 6,909,899 B2* | 6/2005 | Wang | H04L 69/14 |
| | | | 455/432.1 |
| 7,447,901 B1* | 11/2008 | Sullenberger | H04L 63/0272 |
| | | | 713/153 |
| 7,801,030 B1* | 9/2010 | Aggarwal | H04L 45/121 |
| | | | 370/227 |
| 9,923,798 B1* | 3/2018 | Bahadur | H04L 45/00 |
| 11,044,191 B2 | 6/2021 | Vasseur | |
| 2002/0046277 A1* | 4/2002 | Barna | H04L 12/1467 |
| | | | 709/224 |
| 2005/0185621 A1 | 8/2005 | Sivakumar et al. | |
| 2007/0214280 A1* | 9/2007 | Patel | H04L 45/28 |
| | | | 709/239 |
| 2008/0123532 A1* | 5/2008 | Ward | H04L 47/125 |
| | | | 370/238 |
| 2008/0165735 A1* | 7/2008 | Chen | H04L 63/0892 |
| | | | 370/331 |
| 2009/0135729 A1* | 5/2009 | Saffre | H04L 45/306 |
| | | | 370/252 |
| 2010/0091707 A1 | 4/2010 | Janneteau et al. | |
| 2010/0149979 A1* | 6/2010 | Denecheau | H04L 47/283 |
| | | | 370/234 |
| 2010/0211780 A1* | 8/2010 | Mukkara | H04L 63/1466 |
| | | | 713/168 |
| 2012/0099421 A1* | 4/2012 | Hayashitani | H04L 45/28 |
| | | | 370/221 |
| 2012/0284416 A1* | 11/2012 | Li | H04L 65/1101 |
| | | | 709/228 |
| 2013/0182712 A1* | 7/2013 | Aguayo | H04L 12/4675 |
| | | | 370/395.53 |
| 2013/0286846 A1 | 10/2013 | Atlas et al. | |
| 2014/0023039 A1* | 1/2014 | Moses | H04W 48/10 |
| | | | 370/331 |
| 2016/0127149 A1* | 5/2016 | Xue | H04L 41/0803 |
| | | | 370/392 |
| 2016/0294681 A1 | 10/2016 | Khakpour et al. | |
| 2019/0386924 A1 | 12/2019 | Srinivasan et al. | |
| 2020/0252234 A1* | 8/2020 | Ramamoorthi | H04L 45/22 |
| 2021/0281514 A1 | 9/2021 | Guo et al. | |

OTHER PUBLICATIONS

Mathis et al, The macroscopic behavior of the TCP Congestion Avoidance Algorithm, Jul. 1997 (16 pages).

Ye, Jin-Li, et al, A Weighted ECMP Load Balancing Scheme for Data Centers Using P4 Switches, Oct. 22, 2018 (4 pages).

* cited by examiner

ON-DEMAND SETUP AND TEARDOWN OF DYNAMIC PATH SELECTION TUNNELS

BACKGROUND

Various mechanisms are used to route and/or forward traffic within a network. Network resources are required to implement these mechanisms. As the size and complexity of the network increases, the management resources and network resources required to implement the aforementioned mechanisms may limit the ability to scale the network effectively beyond a certain size.

DETAILED DESCRIPTION

Figure 1:
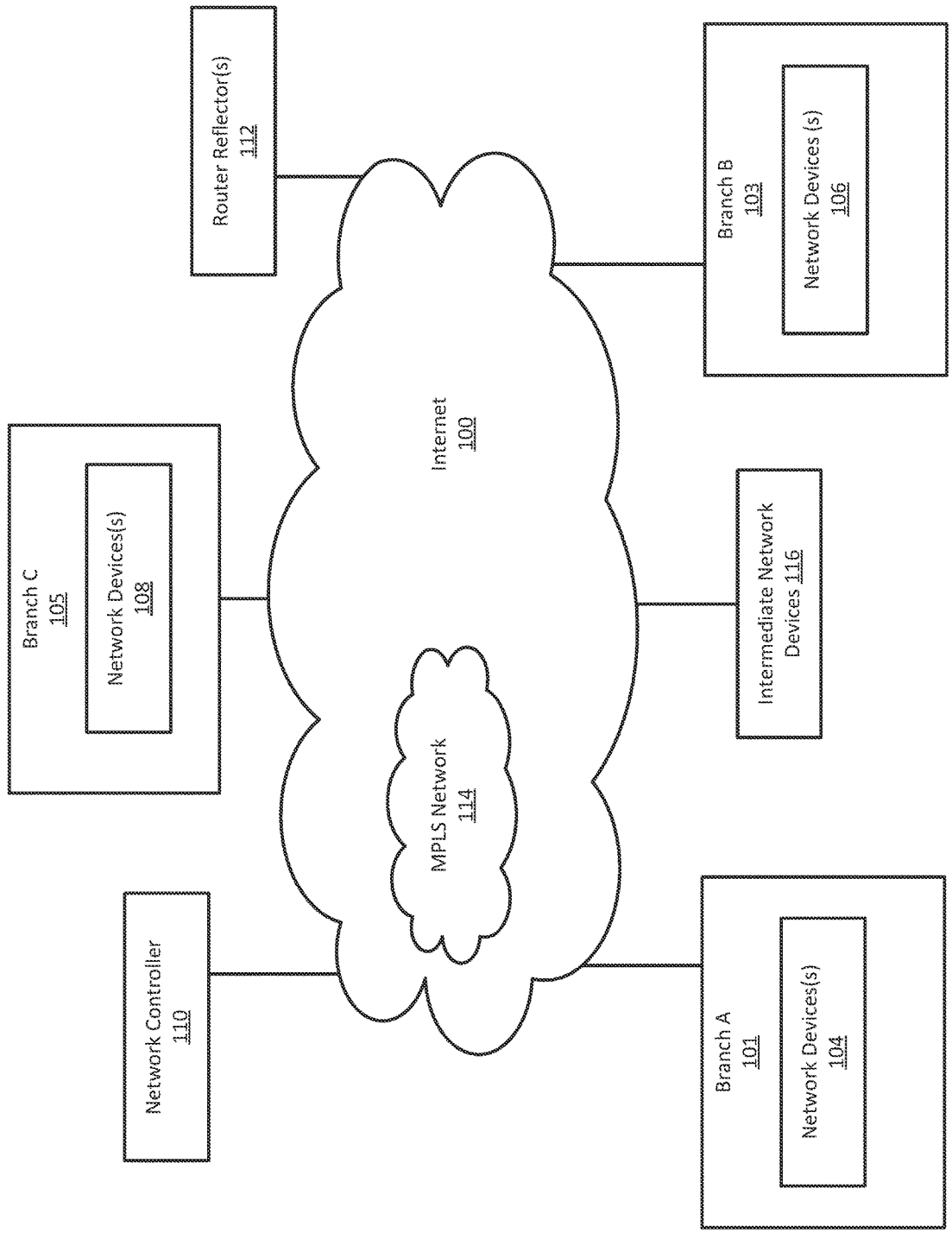
FIG. 1 shows a system in accordance with one or more embodiments.

Modern networks include large numbers of network devices (e.g., routers, switches, etc.). This results in a significant amount of administrative overhead in managing such networks. Further, as the utilization of the network changes over time, the network (or portions thereof) may need to be reconfigured to enable optimal usage of the network. Given the scale of modern networks, this process is very difficult to do manually. As a result, one approach is to implement dynamic path selection (DPS) in the network. DPS enables the network device to select an optimal path from a set of available paths between a source network device and a target network device based on real-time or near real-time monitoring. In one or more embodiments, DPS enables the selection of the optimal path by continuously monitoring the performance of the various paths between the source network device and the target network device. The continuous monitoring enables network devices implementing DPS to select an initial path between the source network device and the target network device. Further, based on this continuous monitoring, another path (i.e., a second path) from the set of available paths may be selected to transmit packets from the network device to the target device if the second path exhibits better performance than the initial path. Thus, the continuous monitoring enables packets to be optimally transmitted from the network device to the target device via the best available path(s).

While DPS enables optimal transmission of packets, there is an overhead associated with the use of DPS. Thus, in certain scenarios it may not be possible to enable DPS for the transmission of packets between all pairs of network devices in a network. Rather, in one or more embodiments DPS may: (i) be enabled by default for certain pairs of network devices, (ii) be enabled on-demand for certain pairs of network devices; and/or (iii) not be enabled for certain pairs of network devices. Using this approach, an administrator may, e.g., configure the network to support DPS in a manner that balances the optimal path selection provided by DPS with the overhead associated with implementing DPS.

In one or more embodiments, network devices for which on-demand DPS is enabled are referred to as DPS capable network devices. When initially deployed, the DPS capable network devices have the necessary configurations to implement DPS but they do not utilize DPS to transmit traffic until a trigger condition (discussed below) is satisfied. Once the trigger condition is satisfied, the network device (referred to as the initiating network device (IND)) may attempt to establish an on-demand tunnel (ODT) (defined below) with a target network device (TND) in accordance with the method shown in FIG. 3.

Prior to the trigger condition being satisfied, the IND may communicate with the TND using a potentially non-optimal path. The potentially non-optimal path corresponds to the path over which the packets travel between the IND and the TND. The potentially non-optimal path may include at least one more next hop than the ODT. In certain scenarios, the potentially non-optimal path may be based on, e.g., an administrative configuration (example below) and/or on resource limitations of the network devices (e.g., a network device may only support N number of ODTs).

Example of Administrative Configuration

Consider a scenario in which the network includes: network device (ND)1, ND2, ND3, Hub Network Device 1 (H1), ND4, ND5, and H2, where ND3 and ND4 may transmit packets to each other without utilizing H1 and H2. In this scenario, the administrator divides the network into two regions (R1 and R2), where (i) R1 includes ND1, ND2, ND3, and H1 and (ii) R2 includes ND4, ND5, and H2. Initially, the administrator configures ND3 and ND4 as DPS capable network devices but steers all traffic between R1 and R2 via H1 and H2. Thus, initially, packets from ND3 to ND4 take the following path: ND3→H1→H2→ND4. In this example, the aforementioned path would be a potentially non-optimal path as ND3 may transmit packets to ND4 without utilizing H1 and H2. As discussed below, once an ODT is established between ND3 and ND4, the packets from ND3 to ND4 may take the following path: ND3→ND4.

End of Example

Returning to the discussion of a trigger condition, as discussed above, the ODT may be initiated by an IND when a trigger condition is satisfied. In one or more embodiments, the trigger condition corresponds to: (i) a threshold amount of packets being sent between the IND and the TND or (ii) a threshold rate of packets being sent between the IND and the TND. If the number or rate of packets being sent between the IND and the TND exceeds a threshold (which may be a default value, a value set by an administrator, may be modified dynamically based on the state of the INT, the TND or any other network device(s), or any combination thereof), then the IND may perform the method shown in FIG. 3. The embodiments are not limited to the aforementioned trigger conditions.

In one or more embodiments, the ODT refers to a tunnel that is established over a selected path, i.e., a path selected using DPS. More specifically, establishing an ODT between the IND and the TND corresponds to enabling the IND and the TND to use DPS to select a path from a set of possible paths between the IND and the TND. Thus, a tunnel is then established over the selected path. As such, the packets transmitted via the ODT may be encrypted and/or augmented depending on the selected path. For example, if the packets traverse a public network (e.g., the Internet), then the packets (or portions thereof) may be encrypted in accordance with Internet Protocol Security (IPSec) protocol prior to being transmitted to the public network. In another example, if the selected path traverses a Multiprotocol Label Switching (MPLS) network, then one or more labels may be added to the packets to generate augmented packets, where the labels enable the augmented packets to be properly transmitted across the MPLS network. Further, because the ODT is determined using DPS, if a currently used path becomes less optimal than another possible path between the IND and the TND, the ODT will be updated to transmit packets over the more optimal path.

Continuing with the discussion of establishing the ODT, once the ODT is established, the ODT (i.e., the ability of the IND and the TND to communicate via an ODT selected using DPS) may be maintained (and capable of transmitting packets between the IND and TND) until a tear down condition is satisfied. The tear down condition may be, e.g., that the number or rate of packets being sent between the IND and the TND is below a threshold for a predetermined period of time. The tear down condition may be any other condition(s). The determination of whether a tear down condition is satisfied may be performed by either (or both) network device(s) that are communicating over the ODT. Once a determination is made by a network device that a tear down condition is satisfied, the network device (referred to as the IND in FIG. 3) may initiate the performance of FIG. 4. The IND referred to in FIG. 4 may be the same network device that was referred to as the IND in FIG. 3 or the IND referred to in FIG. 4 may be the network device that was referred to as the TND in FIG. 3. Said another way, the method shown in FIG. 4 may be performed using either of the network devices that are communicating via the ODT. The method shown in FIG. 4 enables the graceful tear down of the ODT with no (or minimal) disruption of the packet transmission between the IND and the TND.

Various embodiments are described below.

FIG. 1 shows a system in accordance with one or more embodiments. The system includes one or more branches (e.g., Branch A (101), Branch, B (103), Branch C (105), one or more intermediate network devices (116), a network controller (110) and a route reflector (112) all of which are operatively connected through one or more paths that traverse a multiprotocol label switching (MPLS) network (114) and/or the Internet (100). Each of these components is described below.

Figure 5:
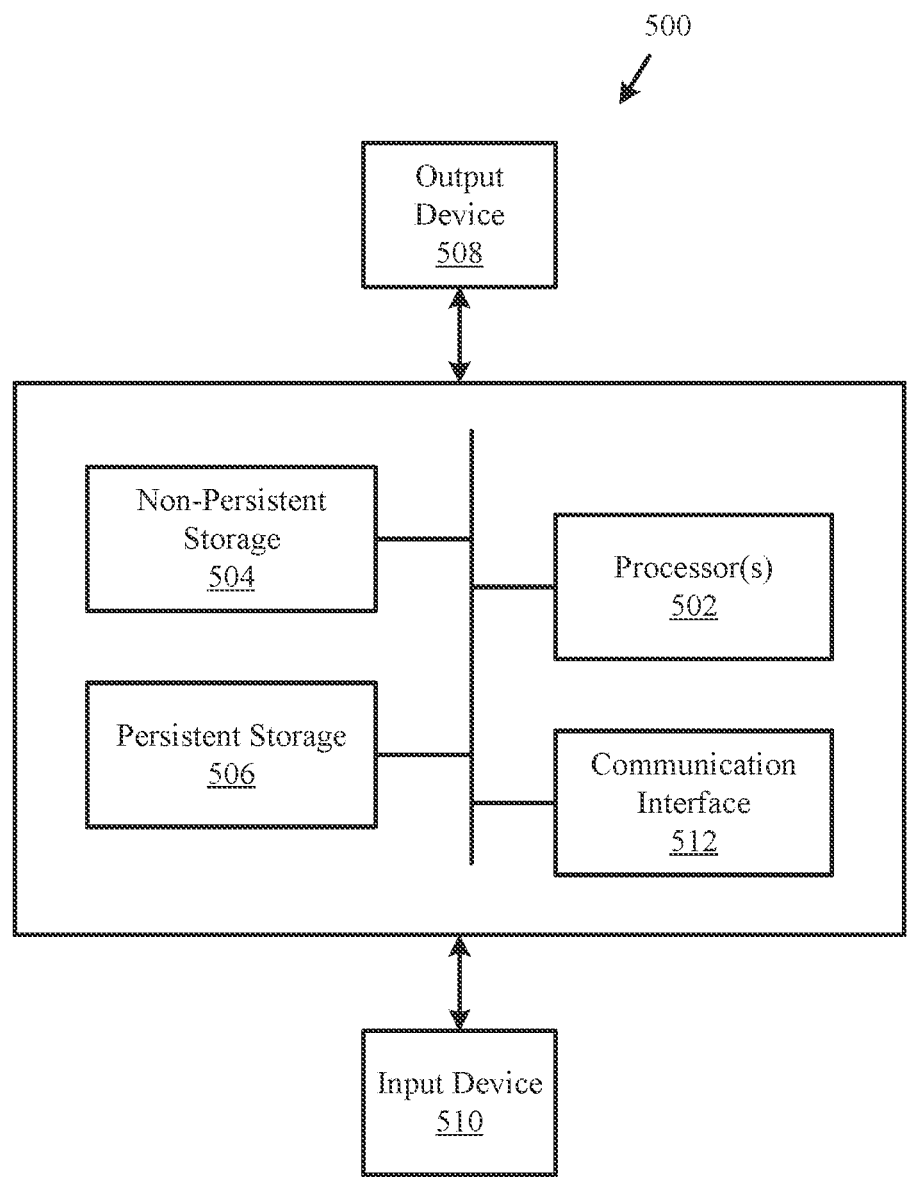
FIG. 5 shows a computing device in accordance with one or more embodiments.

In one or more embodiments, a branch (e.g., 101, 103, 105) corresponds to a network that includes any combination of network devices (e.g., 104, 106, 108) and computing devices (see e.g., FIG. 5). The network devices within a given branch may be arranged in any topology.

In one or more embodiments, a network device (e.g., 104, 106, 108, 116) may be a physical device that includes persistent storage, memory (e.g., random access memory (RAM), shared memory), one or more processor(s) (e.g., integrated circuits) (including a switch chip or network processor)), and two or more physical network interfaces or ports. The switch chip or network processor may be hardware that determines out of which egress port on the network device (e.g., 104, 106, 108, 116) to forward packets. The switch chip or network processor may include egress and ingress ports that may connect to the physical network interfaces or ports on the network device (e.g., 104, 106, 108, 116). Further, each physical network interface or port may or may not be connected to a network element (not shown) or computing device (not shown) in a branch (e.g., 101, 103, 105), to another network device (e.g., 104, 106, 108, 116) in the MPLS network (110), or another network device in the Internet (100). A network device (e.g., 104, 106, 108, 116) may be configured to receive network packets (also referred to as packets or frames) via the network interfaces or ports, and determine whether to: (i) drop the network packet; (ii) process the network packet in accordance with one or more embodiments; and/or (iii) send the network packet, based on the processing, out another network interface or port on the network device (e.g., 104, 106, 108, 116) in accordance with one or more embodiments.

In one or more embodiments, the persistent storage on a network device (e.g., 104, 106, 108, 116) may include any type of non-transitory computer readable medium that includes instructions, which, when executed by the one or more processor(s), enable the network device (e.g., 104, 106, 108, 116) to perform any of the functionalities described below in FIGS. 3-5 and may also include functionality to implement the MPLS and Border Gateway Protocol (BGP). The functionality of the network devices is not limited to the aforementioned examples. Examples of a network device (e.g., 104, 106, 108, 116) include, but are not limited to, a switch, a router, and a multilayer switch. A network device (e.g., 104, 106, 108, 116) is not limited to the aforementioned specific examples.

In one embodiment, the network devices include functionality to implement dynamic path selection (DPS) as described in U.S. patent application Ser. No. 16/809,210 filed on Mar. 4, 2020. U.S. patent application Ser. No. 16/809,210 is hereby incorporated by reference in its entirety.

In one or more embodiments, the Internet (100) is a wide area network (WAN) that includes a set of interconnected network devices or systems (not shown), which operatively connect the one or more network device(s) (e.g., 104, 106, 108, 116). The network devices (and systems) that make up the Internet (not shown) (100) include functionality to facilitate communications between the aforementioned components using one or more routing protocols.

In one or more embodiments, the MPLS Network (114) is a set (or subset) of interconnected network devices of the Internet that include functionality to facilitate communications between these aforementioned components using the MPLS protocol.

In one embodiment, the network controller (110) builds and maintains the state information from each of the network devices (e.g., 104, 106, 108, 116). For each network device, the state information may include, but is not limited to, configuration information, and any other information that may be used to configure and/or manage the network device. In one or more embodiments, the network controller (110) may be implemented as a computing device (see e.g., FIG. 5), a network device, or another type of device that can store the state information for network device and communicate (directly or indirectly) with the network devices (e.g., 104, 106, 108, 116). In one or more embodiments, the network controller includes functionality to interact with the network elements that are performing the method shown in FIG. 2.

In one or more embodiments, the route reflector (112) is configured to receive routes from one or more network devices (e.g., 104, 106, 108, 116) and to forward the received routes to the other network devices (e.g., 104, 106, 108, 116). The route reflector may perform the aforementioned functionality in accordance with RFC 4456 (BGP Route Reflection: An Alternative to Full Mesh Internal BGP (IBGP), 2006). In one or more embodiments, the route reflector (112) may be implemented as a computing device (see e.g., FIG. 5), a network device, or another type of device that can perform the aforementioned functionality and communicate (directly or indirectly) with the network devices in the Internet (100) (including the network devices in the MPLS network (114)).

In one or more embodiments, the network devices (e.g., 104, 106, 108) within a branch (e.g., 101, 103, 105) may be configured to transmit packets to each other using DPS. However, the aforementioned network devices within the branches may: (i) not be permitted to transmit packets using DPS to network devices outside of the branch or (ii) may be DPS capable network devices.

For example, in one or more embodiments certain network devices (e.g., 104, 106, 108) may be operatively connected to one or more intermediate network devices (e.g., 116) (which in various scenarios may be referred to as hub network devices). In such scenarios, packets from certain network devices (e.g., 104, 106, 108) are transmitted to other network devices (e.g., 104, 106, 108) via one or more intermediate network devices (e.g., 116). For example, referring to FIG. 1, packets from a network device in Branch A (101) that are destined for a network device in Branch B (103) may following this path: network device in Branch A (101)→intermediate network device(s) (116)→network Device in branch B (103). When the path between two network devices includes the intermediate network devices (116), the path may be referred to as a sub-optimal path.

As discussed above, due to the overhead associated with implementing DPS, a network administrator may initially configure the network to only permit inter-branch network traffic to be transmitted via the intermediate network devices (116) and enable intra-branch network traffic to be transmitted directly, e.g., using DPS, between network devices within the branch. However, there are scenarios in which limiting inter-branch traffic to a path that includes the intermediate network device(s) may not be ideal for the network traffic being transmitted. In such scenarios, transmission of the network traffic on a path that did not include the intermediate device is preferred. Embodiments of the disclosure enable network administrators to configure network devices to be DPS capable. When a network device is DPS capable, the network device is able to use DPS as-needed to setup on-demand tunnels (ODTs) between itself and a network device in a different branch, where the ODT does not traverse the intermediate network device(s). See e.g., FIG. 3. When either of the network devices communicating over the ODT determine that it no longer needs to send traffic via the ODT, use of the ODT may be stopped and the transmission of subsequent network traffic may resume using a path that includes the intermediate network device(s). See e.g., FIG. 4.

While FIG. 1 shows a configuration of components, other system configurations may be used without departing from the scope of the disclosure. Further, while FIG. 1 uses the term branches to denote various portions of the network, the term regions may also be used without departing from the disclosure.

Figure 2:
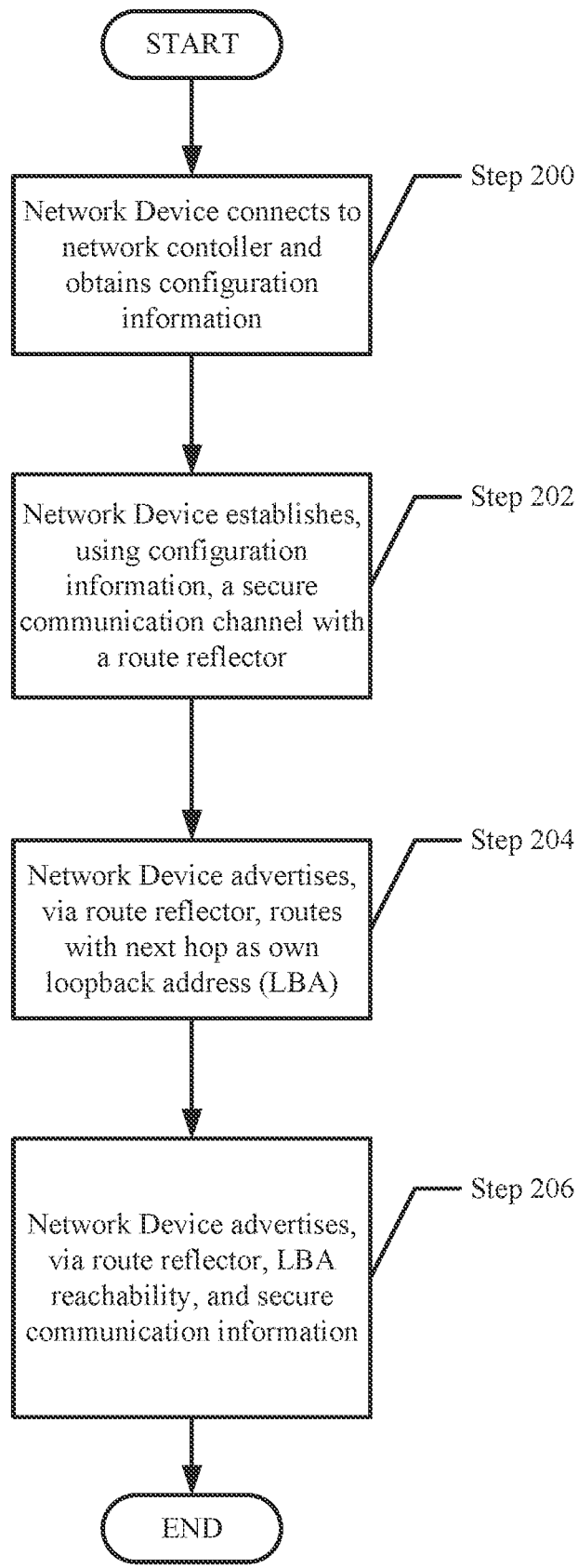
FIG. 2 shows a method for configuring a network device in accordance with one or more embodiments.
Figure 3:
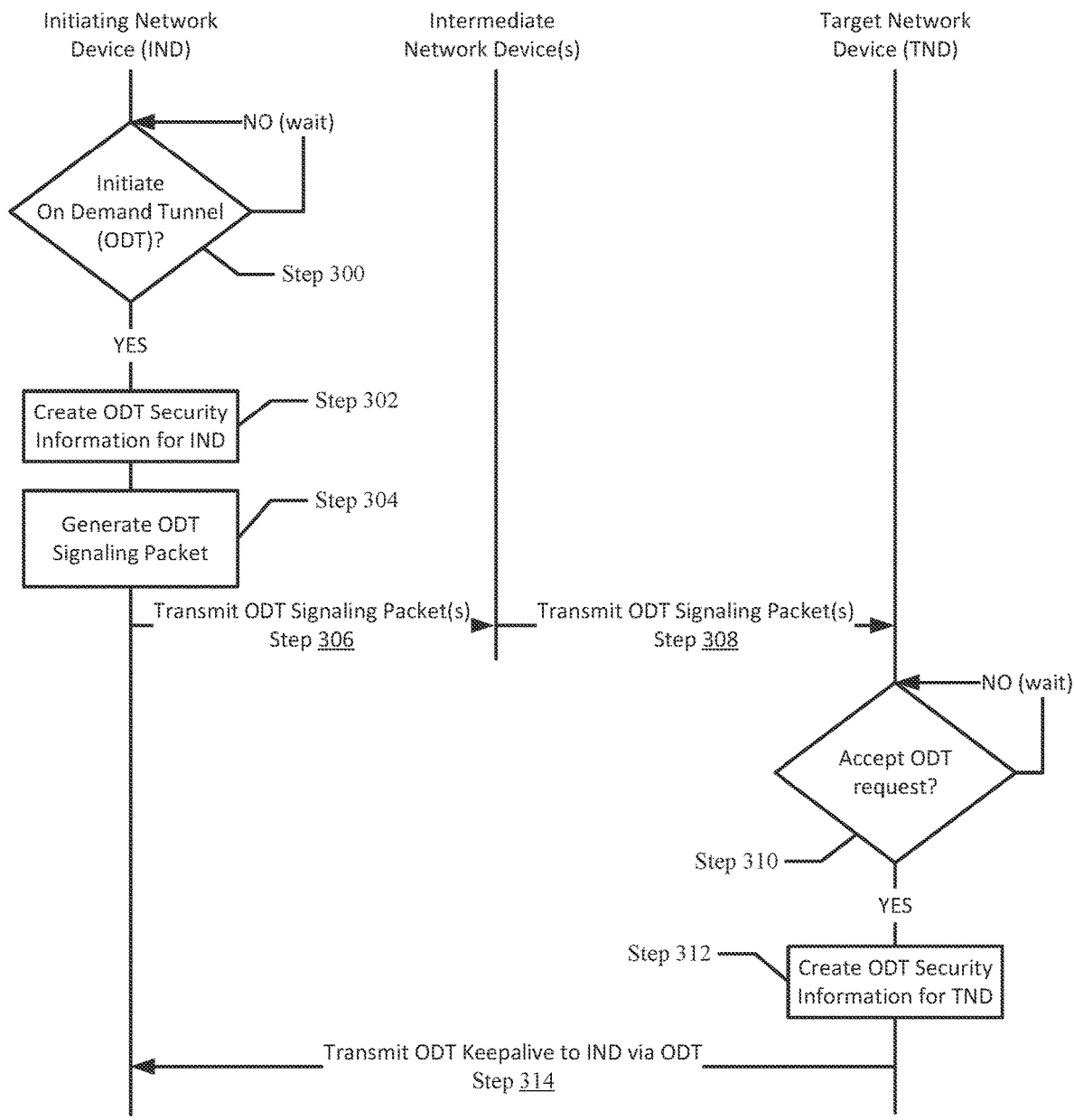
FIG. 3 shows a method for establishing an on-demand tunnel (ODT) in accordance with one or more embodiments.
Figure 4:
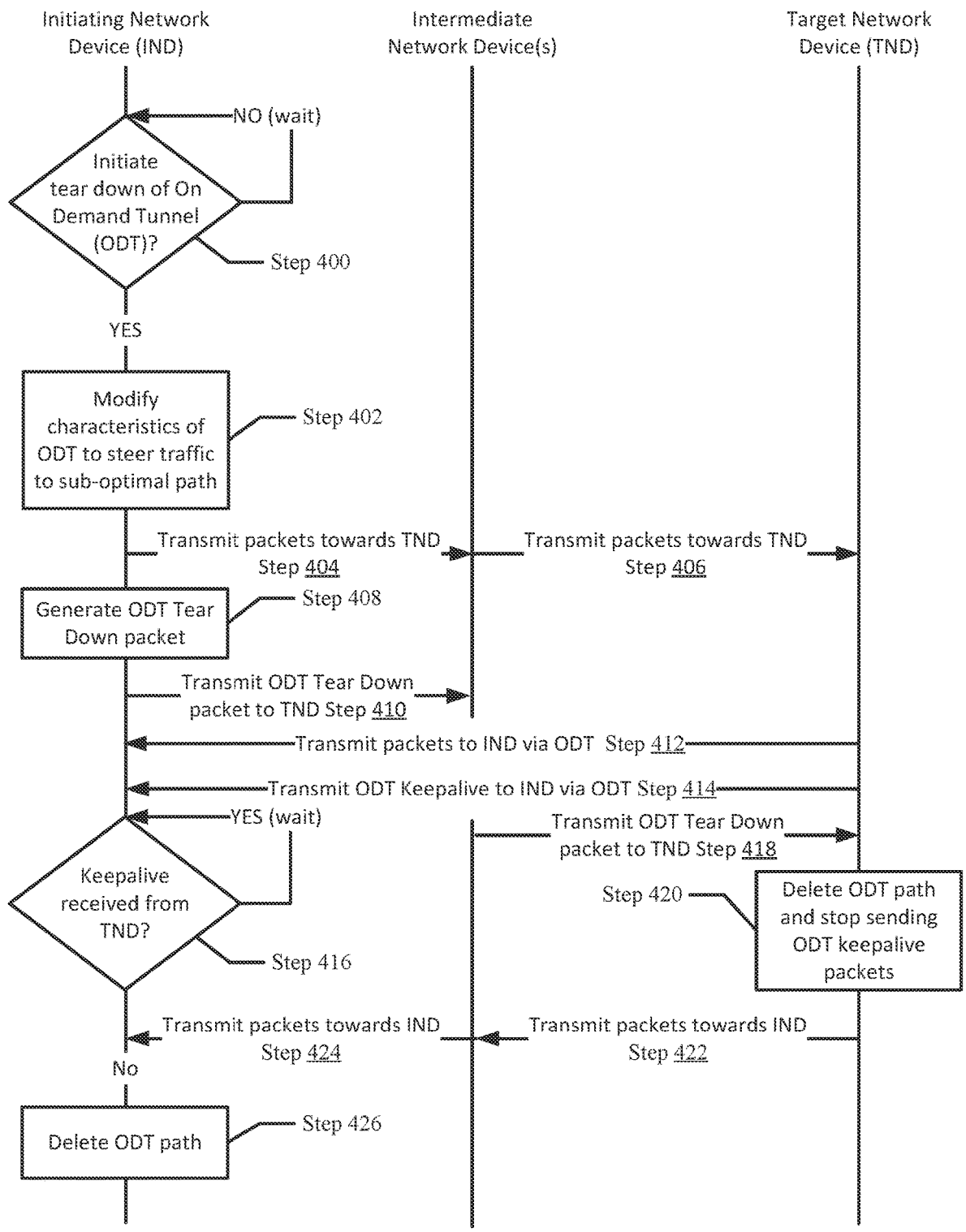
FIG. 4 shows a method for tearing down an ODT in accordance with one or more embodiments.

FIGS. 2-4 show flowcharts in accordance with one or more embodiments. While the various steps in the flowcharts are presented and described sequentially, one of ordinary skill in the relevant art will appreciate that some or all of the steps may be executed in different orders, may be combined or omitted, and some or all steps may be executed in parallel. In one or more embodiments, the steps shown in FIGS. 2-4 may be performed in parallel with any other steps shown in FIGS. 2-4 without departing from the scope of the embodiments.

FIG. 2 shows a method for configuring a network device in accordance with one or more embodiments. The method shown in FIG. 2 may be performed by, for example, a network device (e.g., 104, 106, 108, 116). Other components of the system illustrated in FIG. 1 may perform the method of FIG. 2 without departing from the scope of embodiments described herein.

In step 200, the network device connects to the network controller and obtains configuration information. In one embodiment, the network device includes information, e.g., Internet Protocol (IP) address, authentication credentials, etc. to establish a connection with the network controller. In one embodiment, the connection is an IPSec tunnel. The disclosure is not limited to this type of connection. After a connection is established with the network controller, the network controller provides the configuration information to the network device. The configuration information may include, but is not limited to, instructions (which may be in the form of command line instructions (CLI)) and secure communication information (e.g., Internet Protocol Security (IPSec) information). In one embodiment, the secure communication information may include, but it not limited to, encryption keys (also referred to as keys) as well as any other information required to establish a secure communication channel (e.g., an IPSec session) between the various network devices (e.g., 104, 106, 108) within the network and with the route reflector.

In step 202, the network device, using the configuration information and the secure communication information, establishes a secure communication channel with the route reflector. More specifically, in an embodiment, the network device may execute the instructions (i.e., the instructions included with the configuration information) to establish an IPSec session as part of a route reflector. Prior to step 202, the route reflector is configured to communicate with one or more network devices over one or more secure channels.

In step 204, after the IPSec session has been established with the route reflector, the network device advertises one or more routes. At least one of the routes advertised specifies a prefix along with a loopback address (LBA) of the network device as a next hop. The LBA may be specified by a management process in the network device. The routes may be advertised using Border Gateway Protocol (BGP). More specifically, the network device may use BGP in combination with a route reflector in order to distribute routes to other network devices.

In step 206, the network device, via the route reflector, advertises LBA reachability (i.e., which interfaces on the network device are associated with the LBA) using BGP. In one embodiment of the invention, the LBA reachability is advertised using the BGP extension: ADD-PATH. The LBA reachability information is advertised as loopback network layer reachability information (NLRI). The loopback NRLI includes two primary components: (i) a listing of interfaces with which the LBA is associated and (ii) secure communication information (e.g., IPSec information such as encryption keys). The listing of interfaces may include a set of interface identifiers (e.g., publicly routable IP addresses associated with each of the interfaces), which uniquely identify the interfaces on the network device. The secure communication information corresponds to encryption keys and other information that may be used by the network device to establish secure communication channels with other network devices. In one embodiment, the secure communication information may be specified in the loopback NLRI as a transitive attribute. Specifying the secure communication information as a transitive attribute ensures that the secure communication information is advertised, via BGP, to the other network devices.

Those skilled in the art will appreciate that steps 204 and 206 may be repeated in order to continue to advertise routes and loopback NLRI. For example, if the interfaces associated with the loopback address change, an updated loopback NLRI may be used to communicate an updated listing of interfaces associated with the loopback address.

The network devices (e.g., 104, 106, 108, 116) may use the secure communication information and the routes to transmit network traffic within the branches and between the branches. Further, depending on how the administrator configured the network, the routes used for inter-branch network traffic may initially only include routes that steer the inter-branch network traffic to paths that include the intermediate network device(s).

FIG. 3 shows a method for establishing an on-demand tunnel (ODT) in accordance with one or more embodiments. The method shown in FIG. 4 may be performed by, for example, a network device (e.g., 104, 106, 108). Other components of the system illustrated in FIG. 1 may perform the method of FIG. 3 without departing from the scope of embodiments described herein.

Each DPS capable network device include functionality to monitor the network traffic between the DPS capable network device (referred to below as the initiating network device (IND)) and one or more other network devices (referred to below as the target network devices (TNDs)), which may or may not be DPS capable. The TNDs correspond to the network devices to which the IND is sending network traffic. The monitoring may include determining how many packets have been sent between the IND and various TNDs and/or rate of packets being sent between the IND and the TND.

In step 300, in response to the aforementioned monitoring of the network traffic by the IND, the IND determines whether it should initiate an on-demand tunnel with a given TND. The ODT may be initiated by an IND when a trigger condition is satisfied. In one or more embodiments, the trigger condition corresponds to: (i) a threshold amount of packets being sent between the IND and the TND or (ii) a threshold rate of packets being sent between the IND and the TND. If the number or rate of packets being sent between the IND and the TND exceeds a threshold (which may be a default value, a value set by an administrator, or any combination thereof), the process proceeds to step 302; otherwise, the IND continue to monitor the network traffic between itself and the various TNDs In step 302, the IND creates ODT security information. In one or more embodiments, the ODT security information corresponds to an encryption key that is used to secure communication via the ODT between the IND and the TND. There may be different ODT security information for each IND-TND pair. The ODT security information may correspond to an encryption that is derived (or generated) using a first encryption key associated with the IND and a second encryption key associated with the TND. The first and second encryption keys may be obtained from the route reflector.

In step 304, the IND updates its configuration to enable communication with the TND via the ODT; however, at this stage the IND is not yet able to communicate with the TND as the TND is not aware that the IND is trying to establish an ODT with the TND. Once the configuration is complete, the IND generates an ODT signaling packet. The ODT signaling packet includes information that indicates that the IND is attempting to set up an ODT with the TND.

In step 306, because the ODT is not yet established, the IND sends the ODT signaling packet towards the TND via a path that utilizes the intermediate network device(s). This is the same path that other network traffic between the IND and the TND is currently utilizing.

In step 308, the intermediate network device(s) receives the ODT signaling packet and then transmits it to the TND.

Steps 306 and 308 may be repeated (e.g., the IND sends an ODT signaling packet every second) until the IND receives an ODT Keepalive from the TND (see Step 314).

In step 310, the TND receives, from an intermediate network device, the ODT signaling packet and determines whether to accept the ODT request (i.e., the TND determines whether or not to establish the ODT with the IND). The TND may refuse the ODT request when, for example, (i) the TND is not DPS capable; or (ii) the number of ODTs between the TND and other network devices exceeds a maximum permitted number. The TND may refuse to setup the ODT with the IND for any other reason(s) without departing from the disclosure. If the TND refuses to setup the ODT, then no further action with respect to the ODT is performed. However, when the TND accepts the ODT request, then the process proceeds to step 312.

In step 312, the TND creates ODT security information. In one or more embodiments, the ODT security information corresponds to the same encryption key that was generated by the IND in step 302. More specifically, the TND uses the same process as the IND to independently generate the ODT security information. In addition to generating the ODT security information, the TND updates its configuration to enable communication with the IND via the ODT. The configuration updates may include, but are not limited to, resolving reachability information for public IP address for the IND, making any required changes to enable the TND to transmit packets to the IND over the selected DPS path; as such, this may include, for example, configuring IPSec on the TND. Other configurations on the TND may be updated without departing from disclosure. At this stage, the IND and the TND are able to communicate via the ODT; however, the IND is not aware that the TND is ready to communicate via the ODT.

In step 314, the TND prepares and transmits an ODT Keepalive to the IND via the ODT. In one embodiment, the ODT is an IPSec tunnel and the ODT Keepalive is encrypted using the ODT security information. The receipt of the ODT Keepalive by the IND serves as an acknowledgement (or ack) to the original ODT signaling packet. At this stage, the IND and the TND may communicate via the ODT (and bypass the intermediate network device(s)). The ODT in step 314 corresponds to a tunnel over a path between the IND and the TND, where the path is selected by the TND using DPS.

In one embodiment, the IND and the TND may each periodically send ODT Keepalives via the ODT to confirm connectivity to each other via the ODT and to compute performance characteristics of the ODT.

Following step 318, DPS (which is implemented on the IND and the TND) may continuously monitor the paths between the IND and TND and, per DPS functionality, update the path over which packets are sent between the IND and the TND. Thus, following step 318, the ODT corresponds to a tunnel over the path, selected using DPS, between the IND and the TND, where the selected path may change over time.

FIG. 4 shows a method for tearing down an ODT in accordance with one or more embodiments. The method shown in FIG. 4 may be performed by, for example, a network device, e.g., 104, 106. Other components of the system illustrated in FIG. 1 may perform the method of FIG. 4 without departing from the scope of embodiments described herein.

The IND referred to in FIG. 4 may be the same network device that was referred to as the IND in FIG. 3 or the IND referred to in FIG. 4 may be the network device that was referred to as the TND in FIG. 3.

Continuing with the discussion of FIG. 4, once the ODT is established, the ODT may be maintained (and capable of transmitting packets between the IND and TND) until a tear down condition is satisfied. The tear down condition may be, e.g., that the number or rate of packets being sent between the IND and the TND is below a threshold for a predetermined period of time. The tear down condition may be any other condition(s). The determination of whether a tear down condition is satisfied may be performed by either (or both) network device(s) that are communicating over the ODT.

In step 400, a determination is made about whether tear down (i.e., stop using) of the ODT should be initiated. The tear down of the ODT may be initiated when a tear down condition is satisfied. If a determination is made to initiate the tear down of the ODT, the process proceeds to step 402; otherwise, the IND and TND continue to monitor the ODT. The determination is step 400 corresponds to whether the IND and the TND should continue to communicate via paths selected using DPS or if the IND and TND should revert back to not using DPS.

In step 402, the network device configuration is updated to steer network traffic that is currently being transmitted via the ODT to a path that includes the intermediate network(s) (also referred to as a sub-optimal path). The updating of the network configuration may be to modify the characteristics of routes (each of which may correspond to a different path that may be selected using DPS) associated with the ODT such that these routes appear to be less optimal as compared to the routes associated with the intermediate network device(s). For example, the BGP weight attribute for the routes associated with the ODT may be decreased relative to routes not associated with the ODT.

In one embodiment, the purpose of step 402 is to stop the IND from sending network traffic to the TND via the ODT. Once step 402 is completed, the IND will not transmit network traffic to the TND via the ODT; however, because the TND is not aware that the IND has initiated a tear down on the ODT, the TND continues to send network traffic to the IND via the ODT.

In step 404, the IND sends network traffic to the TND via the intermediate network device. In step 406, the intermediate network device transmits the received network traffic from the IND towards the TND. Step 404 and 406 are performed for all network traffic that is transmitted from the IND towards the TND for at least the remainder of the process shown in FIG. 4.

In step 408, the IND generates an ODT tear down packet to signal to the TND to cease using the ODT to transmit network traffic to the IND.

In step 410, the IND transmits the ODT tear down packet towards the TND via the intermediate network. At this stage, the TND has not learned that the IND is attempting to tear down the ODT. As such, in step 412, the TND continues to transmit network traffic to the IND via the ODT. Further, in step 414, the TND continues to periodically transmit ODT Keepalives to the IND. Steps 412 and 414 are performed by the TND until the TND performs step 420.

At this stage, because the TND is continuing to use the ODT to transmit network traffic to the IND, the IND maintains its configuration of the ODT. By maintaining its configuration of the ODT, the IND continues to be able to receive network traffic from the TND via the ODT.

In order to maintain the ODT, in step 416, the IND continues to monitor whether the TND is still sending the ODT Keepalives. As long as the TND continues to send ODT Keepalives, the IND does not take steps to stop receiving network traffic via the ODT.

In step 418, at some point in time after step 410, the intermediate device(s) that received the ODT tear down packet from the IND, transmits the ODT tear down packet to the TND.

In step 420, receives the ODT tear down packet and in response removes the ODT path from its configuration and stops sending ODT Keepalive packets to the IND via the ODT. At this stage, the TND has updated its configuration to no longer be able to send or receive network traffic from the IND via the ODT; however, the IND has still not updated its configuration such that it is also no longer be able to send or receive network traffic from the IND via the ODT. As will be readily apparent, step 408-414 may occur in various orders, including simultaneously in various scenarios with the exception that steps 410 and 418 occur some time after step 408.

In step 422, based on the updated configuration, the TND sends network traffic to the IND via the intermediate network device(s). In step 424, the intermediate network device(s), upon receipt of the network traffic from the TND, transmits the network traffic to the IND. At this stage, all traffic between the IND and the TND is being transmitted via the intermediate network devices.

In step 426, in response to determining that the TND is no longer sending Keepalives via the ODT (see e.g., Step 416), the IND removes the ODT path from its configuration. At this stage, the IND has updated its configuration to no longer be able to send or receive network traffic from the IND via the ODT.

FIG. 5 shows a computing system in accordance with one or more embodiments. For example, as shown in FIG. 5, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), one or more communication Interfaces (512) (e.g., Bluetooth module, infrared module, network module (which may be wired or wireless), cellular module (e.g., an module that supports one or more cellular data communication protocols), optical module, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

In one or more embodiments, the computing device (500) may be any type of system (e.g., software and computer hardware) that is configured to generate, send, receive, and/or process requests and replies either locally or over a network using software and computer hardware. The computing device (500) may include functionality to generate, receive, and/or transmit MAC frames. Examples of a computing devices (500) may include, but are not limited to, a server (e.g., a database server, a dynamic host configuration protocol (DHCP) server, an application server, a file server, a print server, a mail server, or any other server), a desktop computer, a mobile device (e.g., a laptop computer, a smart phone, a personal digital assistant, a tablet computer, or any other mobile device), or any other type of computing device with the aforementioned minimum requirements.

Software instructions in the form of computer readable program code to perform embodiments described throughout this disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

As shown above, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for creating an on-demand tunnel (ODT) in a network between a first network device and a second network device, the method comprising:
    transmitting, by the first network device, network traffic toward the second network device via a path that includes an intermediate network device;
    determining that a trigger condition to create the ODT between the first network device and the second network device is satisfied, the trigger condition being based on a number of packets transmitted via the path exceeding a threshold, wherein the ODT bypasses the intermediate network device;
    in response to the determination:
        transmitting, by the first network device, an ODT signaling packet toward the second network device via the path that includes the intermediate network device, wherein the ODT signaling packet includes information indicative of the first network device attempting to set up the ODT with the second network device;
        receiving, from the second network device and in response to transmitting the ODT signaling packet, an ODT keepalive by the first network device via the ODT that bypasses the intermediate network device, wherein the ODT keepalive serves as an acknowledgement to the ODT signaling packet; and
        transmitting, after receiving the ODT keepalive, a second packet toward the second network device via the ODT.

2. The method of claim 1, wherein prior to determining that the trigger condition is satisfied, the first network device is configured to transmit network traffic to the second network device via the path.

3. The method of claim 1, wherein the path has at least one more network hop than an additional path associated with the ODT.

4. The method of claim 1, wherein the ODT is a tunnel established over an additional path of a plurality of paths between the first network device and the second network device, wherein the additional path is selected from the plurality of paths using dynamic path selection.

5. The method of claim 4, wherein a first path of the plurality of paths traverses a public network and a second path of the plurality of paths traverses a multiprotocol label switching (MPLS) network.

6. The method of claim 1, further comprising:
generating, by the first network device, a key using a first key associated with the first network device and a second key associated with the second network device, wherein at least a portion of the second packet is encrypted using the key.

7. The method of claim 6, wherein the second key is obtained from a route reflector operatively connected to the first network device and the second network device.

8. The method of claim 1, wherein the threshold is a threshold rate associated with the number of packets over a period of time.

9. The method of claim 1, wherein the intermediate network device is a hub network device and wherein the transmitted ODT signaling packet is received by the hub network device and transmitted to the second network device by the hub network device.

10. A method for tearing down an on-demand tunnel (ODT) in a network between a first network device and a second network device, the method comprising:
making a first determination, based on monitoring the ODT, that a tear down condition to tear down the ODT between the first network device and the second network device is satisfied;
in response to the first determination:
modifying, on the first network device, characteristics of the ODT to steer packets destined for the second network device away from the ODT and to a path between the first network device and the second network device different from the ODT, the path including an intermediate network device between the first and second network devices and the ODT bypassing the intermediate network device;
transmitting, by the first network device, a tear down packet destined for the second network device via the path including the intermediate network device and different from the ODT bypassing the intermediate network device, wherein the tear down packet signals to the second network device to cease use of the ODT and wherein the first network device is configured to receive packets from the second network device via the ODT during a time period after transmitting the tear down packet;
in response to transmitting the tear down packet, making a second determination that the second network device has stopped sending ODT keepalives destined for the first network device; and
in response to the second determination, deleting paths associated with the ODT from the first network device.

11. The method of claim 10, further comprising:
generating, by the first network device, a first key using a second key associated with the first network device and a third key associated with the second network device, wherein at least a portion of the packet is encrypted; and
decrypting, by the first network device, at least the portion of the packet using the key.

12. The method of claim 11, further comprising:
generating, by the first network device, a fourth key using the second key associated with the first network device and a fifth key associated with an intermediate network device;
after the modifying:
sending, by the first network device, a second packet to the second network device via the path different from the ODT, wherein at least a portion of the second packet is encrypted using the fourth key.

13. The method of claim 11, wherein the fourth key is obtained from a route reflector operatively connected to the first network device and the second network device.

14. The method of claim 10, wherein prior to determining that the tear down condition is satisfied, the first network device is configured to transmit packets to the second network device via the ODT.

15. The method of claim 10, wherein the path different from the ODT has at least one more network hop than a path associated with the ODT.

16. The method of claim 10, wherein the ODT is a tunnel established over an additional path of a plurality of additional paths between the first network device and the second network device, wherein the additional path is selected from the plurality of additional paths using dynamic path selection.

17. The method of claim 16, wherein at least one path of the plurality of additional paths traverses a public network and at least another path of the plurality of additional paths traverses a multiprotocol label switching (MPLS) network.

18. The method of claim 17, wherein the public network is the Internet.

19. The method of claim 10,
wherein the first network device is in a first region of the network and the second network device is in a second region of the network,
wherein one of the first region and the second region comprises the intermediate network device, and
wherein the path different from the ODT comprises an additional intermediate network device in the other one of the first region and the second region.

20. The method of claim 10, wherein the first network device is configured to receive at least one ODT keepalive from the second network device via the ODT during the time period after transmitting the tear down packet.

* * * * *